United States Patent
Haglund

(10) Patent No.: US 7,751,314 B2
(45) Date of Patent: Jul. 6, 2010

(54) LOAD DISTRIBUTION BETWEEN NODES IN COMMUNICATION NETWORKS

(75) Inventor: Anders Haglund, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1995 days.

(21) Appl. No.: 10/473,121

(22) PCT Filed: Mar. 28, 2001

(86) PCT No.: PCT/SE01/00681

§ 371 (c)(1), (2), (4) Date: Sep. 29, 2003

(87) PCT Pub. No.: WO02/080613

PCT Pub. Date: Oct. 10, 2002

(65) Prior Publication Data

US 2004/0087311 A1 May 6, 2004

(51) Int. Cl.
- G01R 31/08 (2006.01)
- G06F 11/00 (2006.01)
- G08C 15/00 (2006.01)
- H04J 3/14 (2006.01)
- H04L 1/00 (2006.01)
- H04L 12/26 (2006.01)

(52) U.S. Cl. ............ 370/229; 370/235; 370/236

(58) Field of Classification Search ........... 370/237, 370/229, 230, 235, 256, 289, 400, 406, 410; 395/675, 395, 673, 650, 700; 709/226, 223, 709/203, 201, 200

See application file for complete search history.

(56) References Cited

U.S. PATENT DOCUMENTS 5,539,815 A 7/1996 Samba (Continued)

FOREIGN PATENT DOCUMENTS

EP 0 647 081 A2 9/1994

(Continued)

OTHER PUBLICATIONS

Niranjan et al., Load Distributing for Locally Distributed systems) IEEE Dec. 1992.*

(Continued)

*Primary Examiner*—Ricky Ngo
*Assistant Examiner*—David Oveissi
(74) *Attorney, Agent, or Firm*—Nixon & Vanderhye, P.C.

(57) ABSTRACT

The present invention discloses a node selection procedure. A load is obtained, having a priority level. The first step selects a node from a first subset of available nodes. If the node is capable of accepting the load, i.e. if the congestion level is low enough to allow a load of the present priority level, the node is selected as a destination node. If the congestion level of the node is too high to allow the node to accept the load, the second step is performed. The second step creates a second subset of nodes, all capable of accepting the load. One of the nodes is then selected as destination node. This second selected node is guaranteed to be able to accept the load. The load is then directed to the selected destination node. If the second subset is empty, the load has to be discarded.

27 Claims, 6 Drawing Sheets

U.S. PATENT DOCUMENTS

| | | | | |
|---|---|---|---|---|
| 5,539,883 | A | * 7/1996 | Allon et al. | 718/105 |
| 5,687,167 | A | * 11/1997 | Bertin et al. | 370/406 |
| 5,715,294 | A | * 2/1998 | Pester, III | 379/32.03 |
| 5,867,706 | A | * 2/1999 | Martin et al. | 718/105 |
| 6,078,960 | A | * 6/2000 | Ballard | 709/229 |
| 6,108,307 | A | * 8/2000 | McConnell et al. | 370/235 |
| 6,128,279 | A | * 10/2000 | O'Neil et al. | 370/229 |
| 6,138,159 | A | 10/2000 | Phaal | |
| 6,144,636 | A | * 11/2000 | Aimoto et al. | 370/229 |
| 6,775,234 | B1 | * 8/2004 | Garcia-Martin | 370/237 |
| 7,062,556 | B1 | * 6/2006 | Chen et al. | 709/226 |
| 2002/0126823 | A1 | * 9/2002 | Kumar et al. | 379/221.06 |

FOREIGN PATENT DOCUMENTS

WO            00/11841 A1     3/2000

OTHER PUBLICATIONS

Reinhard et al. "Classification of Load Distribution Algorithms",1996, IEEE Proceeding of PDP 96.*

Jingsha et al, "Internet Traffic Control and Management Architecture", 1998 International Conference on Communication Technology Proceedings, Oct. 22-24, 1998, vol. 2, pp. 1-5.

International Search Report mailed Nov. 28, 2001 in corresponding PCT application No. PCT/SE01/00681.

International Preliminary Examination Report mailed Feb. 14, 2003 in corresponding PCT Application No. PCT/SE01/00681.

International Telecommunication Union ITU-T Q.714, Series Q: Switching and Signalling; Specification of Signalling System No. 7 - Signalling Connection Control Part; Signalling Connection Control Part Procedures, Jul. 1996.

* cited by examiner

| SUBSET B | |
|---|---|
| NODE | PROB. |
| N1 | 0.25 |
| N2 | 0.25 |
| N3 | 0.25 |
| N7 | 0.25 |

← RANDOM POINTER

Fig. 6A

| SUBSET B | |
|---|---|
| NODE | POINTER |
| N1 | |
| N2 | ← |
| N3 | |
| N7 | |

Fig. 6B

LOAD DISTRIBUTION BETWEEN NODES IN COMMUNICATION NETWORKS

This application is the U.S. National phase of international application PCT/SEO1/00681 filed 28 Mar. 2001 which designates the U.S.

TECHNICAL FIELD

The present invention relates generally to distribution of load between nodes in data- and/or telecommunication systems and in particular to distribution of load in a system comprising a plurality of parallel nodes, i.e. a one-to-multi or a multi-to-multi node system.

BACKGROUND

In the new UMTS architecture with a connectivity layer and a call control layer, Media Gateways (MG) will be used for the connectivity layer. In the call control layer, Media Gateway Controllers (MGC) will be used. The MGC controls the distribution of new calls to MG. Congestion situations are always troublesome.

A standard mechanism for general congestion situations is based on that the node is associated with a congestion level (CL), being a measure of the present overload of the node. Within each CL, there are a number of sublevels, congestion sublevels (CSL) available for making a smooth transition between conditions relevant for the different main CLs. Each message is assigned a congestion priority (CP) set by the system and depending on the nature of the call request. Such a procedure is recommended in SCCP, ITU-T recommendation Q.714.

A typical way to proceed is:

A message that has a CP larger than the CL is accepted and sent to the node.

A message that has a CP smaller than the CL is blocked and discarded and is thus not sent to the congested node.

From the messages having a CP equal to CL, a first fraction is accepted and sent to the node. The rest is blocked and discarded. This first fraction is equal to 1 minus the ratio of the CSL and the total number of available sublevels.

This procedure will limit the signalling in case of congestion, and the sublevels will smoothen the transition between the different CLs.

A problem arises when there are more than one link/node/MG to send to, i.e. when the messages that are discarded instead could be redistributed to another exchangeable node instead. In most message systems, this is not at all interesting, since the messages are addressed to one specific node, and no other node is of interest. However, it could be of interest on a higher level than individual messages, e.g. where it is possible to redistribute e.g. a whole series of messages to another node, when the series is started up.

A typical example of such a situation occurs in telecommunication systems, where a call can be considered as a series of messages, started-up by some initialization message or call setup. For instance, in the UMTS architecture, there might be several MGCs and several MGs. Each MGC may select a MG among a set of MGs to be used for a call setup. The reminder of the traffic associated with that call will then continue to use the same MG.

A problem thus arises when going from a one-to-one node system to a one-to-multi or multi-to-multi node system. Congestions at the different nodes have to be handled and an efficient redistribution of load has to be performed.

One possible solution is to always select the least loaded MG. That is the one with the lowest CL (and CSL). In, for instance, telecommunication systems, there are, however, problems connected to this. One problem is that with such a solution, all load within a certain time period will be directed to one and the same node (before the congestion measurement reacts). Since the main load of a call is noticed in the node with a certain time delay, the CL and CSL will start to increase only after some time. When the congestion level of this node passes the congestion level of another node, then all load will be directed to this other node instead. This procedure will subsequently lead to oscillations in the load between the different nodes. With large inertia in the system, high amplitude oscillations and risk for overloading will occur. The problem gets worse and worse with an increasing number of available nodes.

SUMMARY

An general object with the present technology is to provide a method and a device for congestion controlled load distribution in a one-to-multi or multi-to-multi node system. Another object is to provide a method and a device giving less load oscillations at the different nodes. A further object is to distribute some of the load also to nodes with non-minimum congestion levels in an efficient manner. Yet a further object is to distribute the load equally among equally congested nodes.

The above objects are accomplished by methods and devices according to a node selection procedure, having at least two main steps, is provided. In a first main step an attempt to find a node which is able to manage the load is made. If this fails, a "safe" node selection is made in a second main step. Each load obtained, has a priority level. The first step selects a node from a first subset of available nodes. If the node is capable of managing the load, i.e. if the congestion level of the node is low enough to allow a load of the present priority level, the node is selected as a destination node. If the congestion level of the node is too high to allow the node to manage the load, the second step is performed. The second step creates a second subset of nodes, all capable of managing the load. One of these nodes is then selected as destination node. This second selected node is very likely to be able to manage the load. The load is then directed to the selected destination node. If the second subset is empty, the load has to be discarded.

The first subset is preferably a subset comprising all nodes having a congestion level less than or equal to the priority level. But most preferably, the first subset comprises all nodes. The second subset is preferably a subset comprising all nodes having a congestion level less than the priority level. The selection from a subset can be performed in a random manner giving the nodes the same probability to be selected. Alternatively, the nodes are arranged in a specific order and the selection is performed one after one in this order.

The criterion deciding if a node is likely to manage a load or not is preferably performed according to the above described recommendation Q.174. Preferably, the congestion measures of the nodes are continuously or intermittently updated. The congestion measure could either be calculated in the load distribution device or be obtained from explicit information sent from the congested node to the load distribution device.

In a generalisation of the method, the number of main steps can be larger than two, selecting nodes from different subsets of nodes.

The technology takes advantage of the whole congestion situation of the system to distribute calls among the nodes.

The oscillations are reduced and the total throughput is increased. When no nodes are congested, the load is equally distributed. If the intensity and mix of new calls is stable, and if the congestion level or a congestion sublevel of one node changes, then the load towards other nodes with higher or equal congestion level is not at all affected. If the intensity and mix of new calls is stable, then the load towards one congested node is a linear function of the congestion sublevel for that node (with other conditions constant).

BRIEF DESCRIPTION OF THE DRAWINGS

The invention, together with further objects and advantages thereof, may best be understood by making reference to the following description taken together with the accompanying drawings, in which:

FIGS. 6a and b are a block diagrams illustrating two methods of selecting nodes from subsets.

DETAILED DESCRIPTION

In order to avoid load oscillations in a one-to-multi-node system or a multi-to-multi-node system, some load should preferably be directed also to nodes having a higher congestion level than the minimum. This distribution has to be performed in a simple and efficient manner, requiring small and negligible processing resources. Furthermore, the total load throughput should not be reduced, but rather improved.

A "congestion level" is selected from a limited set of consecutive congestion levels. The congestion levels are thus possible to arrange in a specific order, from a lowest congestion level to a highest one. In the present disclosure, this order is assumed to range from a lowest congestion level equal to zero to a highest congestion level equal to the number of congestion levels in the set minus one. Anyone skilled in the art, however, understands that this numbering is arbitrary and any other means for ordering of the levels can be used as well. However, in all cases, the set can be "relabelled" to be a set comprising congestion levels corresponding to integers. In a more general formulation, the set of congestion levels could be characterised by at least two of the parameters: a maximum and minimum value, respectively, and the total number of congestion levels in the set.

The corresponding argumentation is true for "priority levels".

A "congested node" is in the present disclosure defined as a node having a higher amount of offered incoming load than capacity of processing the load. If the concept of congestion levels is defined, a congested node is a node having a non-zero congestion level or a non-zero congestion sublevel.

A somewhat congested node, i.e. a node with a low but non-zero congestion level, may still be likely to manage a smaller amount of new load. A distribution device may therefore, according to common standard procedures, be permitted to send load to the node in question, if the load has a high enough priority level. If load with different priorities are to be distributed by one and the same distribution device, the distribution has to be performed in such a way that the available capacity is utilised in an efficient manner.

A first node selection is made from a first group of nodes, which nodes preferably have as high mean congestion level as possible. Most preferably, this first group of nodes comprises all available nodes, but may comprise other sets of nodes as well. If the selection fails, the final selection is made from a group of "safe" nodes, typically having a lower mean congestion level.

Figure 1:
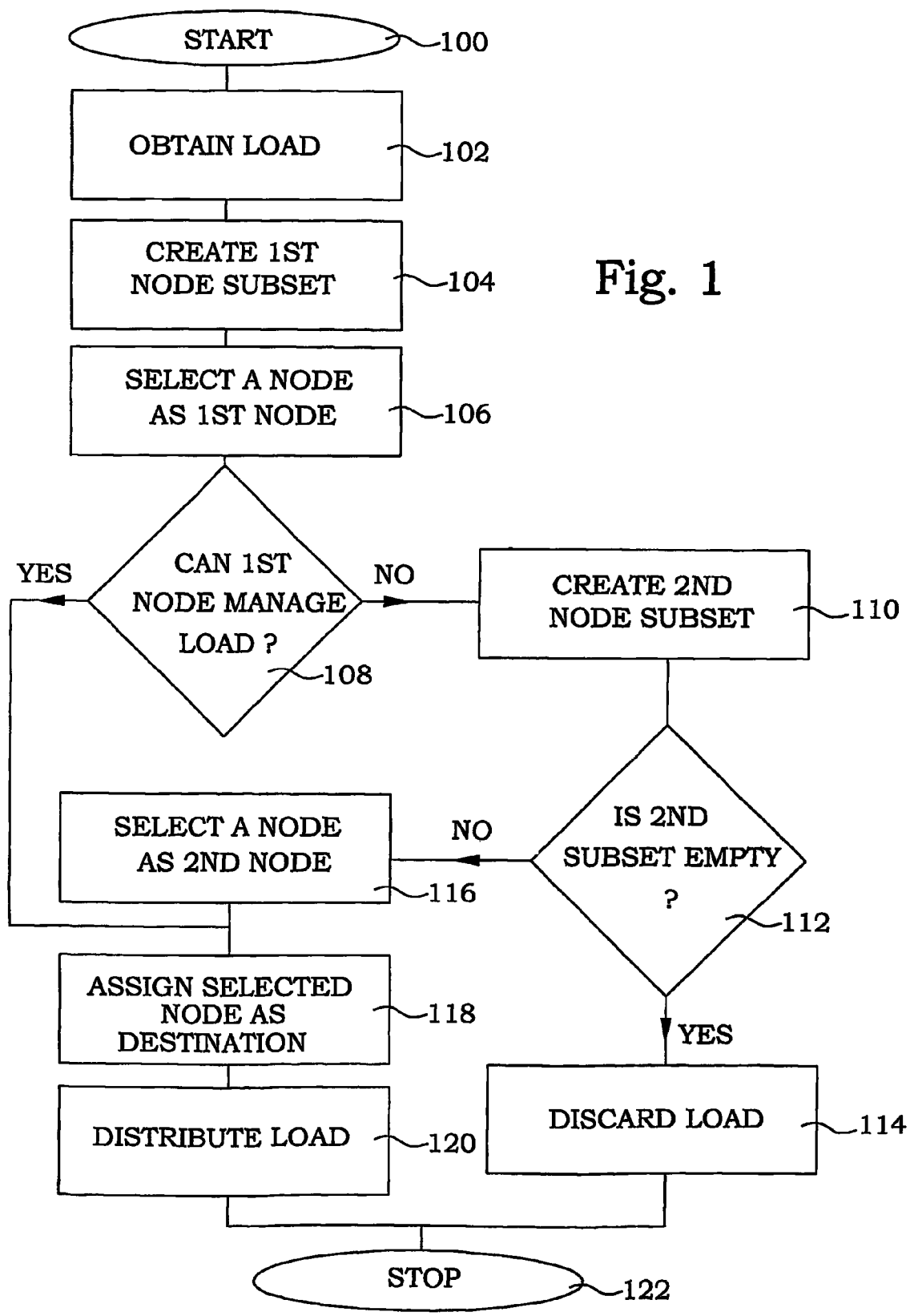
FIG. 1 is a flow diagram illustrating a two main step method according to an example embodiment.

FIG. 1 illustrates a first example embodiment of a method having two main steps. The system in which this procedure operates comprises a plurality of nodes, to which a load can be distributed. Each node has an associated congestion level. The procedure starts in step 100. In step 102 a load to be distributed is obtained. The load has an associated priority level. A first subset of nodes is created in step 104. The first subset may comprise all nodes having a congestion level less than or equal to a predefined number. This predefined number may e.g. be equal to the priority level of the load. However, preferably, the first subset comprises all nodes, i.e. the first subset is equal to the entire set of nodes itself. This means that the first subset typically also comprises nodes, which not with a total certainty can manage the load. However, there might be a certain non-zero probability.

In a preferred embodiment, the number of priority levels should be equal to or less than the number of congestion levels.

A first node is selected from this first subset of nodes in step 106. The selection can be performed according to different procedures, described further below. Since the first subset may comprise both nodes, to which it is permitted to send the load, and nodes, to which it is not permitted to send the load, an evaluation has to be performed. In step 108, it is determined whether or not it is permitted to send the load to the first node, according to a predetermined criterion. The preferred forms of criteria are discussed further below. If it is permitted to send the load to the first node, an allowed destination node is found, and the procedure proceeds to step 118. If, on the other hand, it is not permitted to send the load to the first node, the procedure proceeds to the second main step, beginning at step 110.

In step 110, a second subset of nodes is created. This second subset comprises only nodes in the system, which each one by certainty can accept the load according to the predetermined criterion mentioned above. The second subset preferably comprises all congested nodes having a congestion level less than a predefined number, less than or equal to the priority level of the loads and all nodes that are not congested at all. Even more preferably, this predefined number is equal to the priority level of the load. This means that the second subset only comprises nodes, to which it is permitted to send the load with an absolute certainty. The second subset is preferably a subset also of the first subset.

If all nodes in the system are so occupied that none with absolute certainty can accept the load, there are problems taking care of the load. In step 112, it is checked if the second subset is empty. If this is the case, i.e. no node could manage the load, the load has to be discarded in step 114. If the second subset comprises at least one node, a node from the second subset is selected in step 116. The details of this selection are described more in detail below. This selected node is very likely to be available for managing the load.

In step 118, any selected node, either from the first main step, i.e. from the first subset, or from the second main step, i.e. from the second subset is assigned as a destination node.

Finally, in step 120, the load is distributed to the destination node. The procedure ends in step 122.

In other words, the procedure is based on the concept to first try to distribute the load to a node in a first subset. If this is not successful, a safe choice of node is made.

In a generalised form, the procedure can include more than one trial steps, before the final safe and secure selection is made. This can be illustrated by the flow diagram of FIG. 2. The steps in FIG. 2 have corresponding features as in FIG. 1, but in a repeated manner. The procedure begins in step 200. In step 202, the load to be distributed is obtained. As described earlier, the load is associated with a priority level. The procedure continues with a first main step, illustrated by the broken box 210. In this first main step, a first subset of nodes is selected in step 212, in a manner corresponding to step 104 in FIG. 1. A first node is selected from this first subset in step 214. In step 216, it is determined whether it is permitted to send the load to the selected first node or not. If the first node can manage the load, the procedure continues to the finalising steps, starting with step 238. If, however, the first node can not manage the load, the procedure will continue to the next main step.

The next main step comprises the corresponding steps as in main step 210, and the process will proceed to a subsequent main step as long as it is not permitted to send the load to the selected nodes. In the FIG. 2, it is assumed that n main steps are present. The (n−1):th main step is illustrated in full, indicated by 220. The (n−1):th main step starts with step 222, where a (n−1):th subset of nodes is created. In step 224, a (n−1):th node is selected from the (n−1):th subset. In step 226, it is determined whether or not the load is permitted to be sent to the (n−1):th node. If the load is permitted to be sent, the procedure continues with step 238, otherwise the procedure continues to the n:th and last main step, illustrated by 230.

In the last main step, in step 232, a n:th subset is selected. This n:th subset is selected in the same manner as the second subset in FIG. 1. In step 234, it is determined if the n:th subset is empty or not. If the subset is empty, no node could manage the load, and the load is discarded in step 242. If the subset comprises at least one node, one of the nodes in the n:th subset is selected as the n:th node in step 236. In step 238, any selected node from any of the main steps is assigned as a destination node. In step 240, the load is distributed to the destination node. The procedure ends in step 244.

Figure 2:
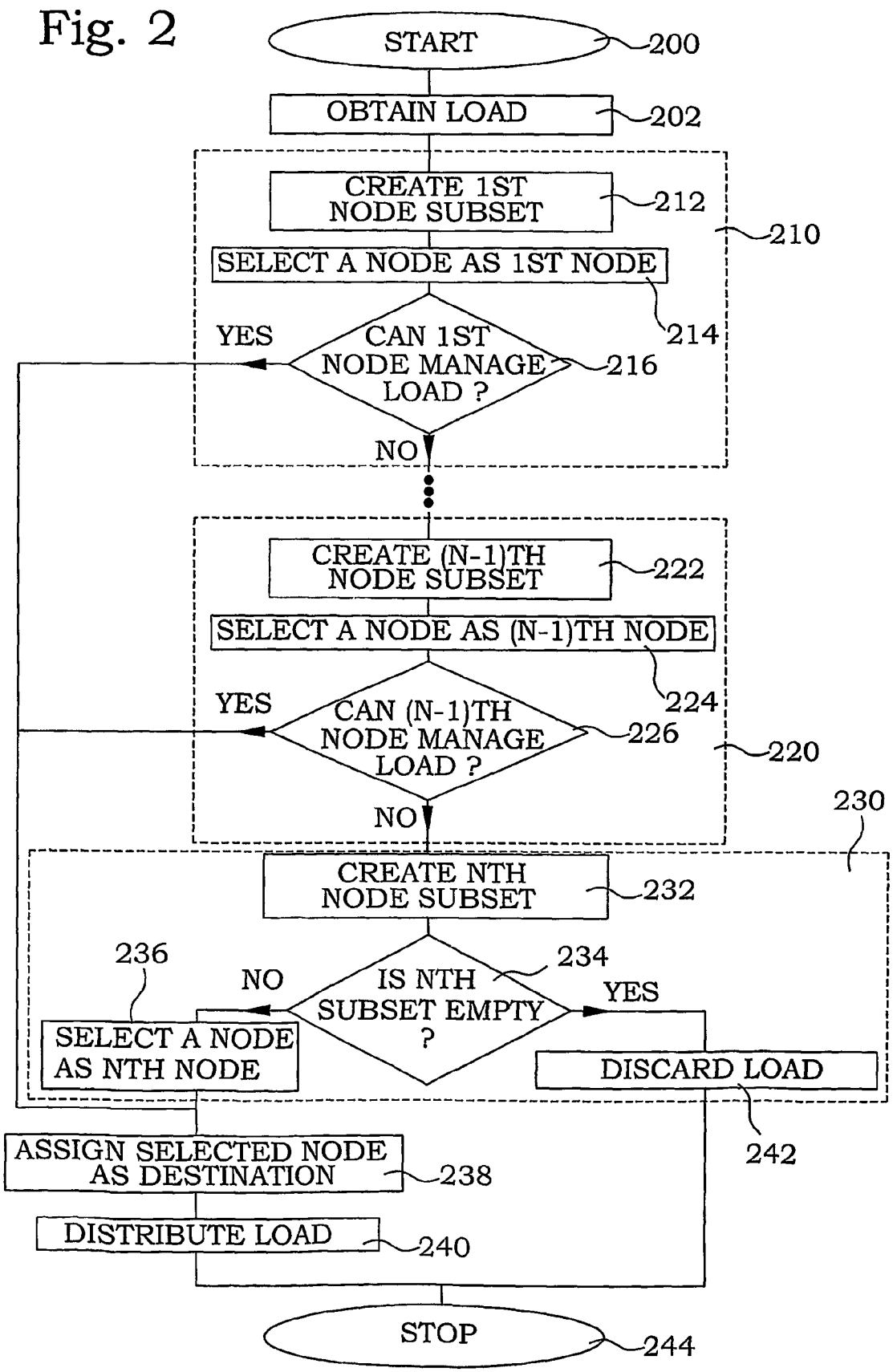
FIG. 2 is a flow diagram illustrating a method with n main steps according to an example embodiment.

As anyone skilled in the art understands, the flow diagram of FIG. 1 corresponds to the one in FIG. 2, with n equal to two. The number of trials, i.e. main steps, that is worth having, will generally depend on the specific application. In a possible preferred embodiment, the m:th subset comprises all nodes of the (m−1):th subset except the selected (m−1):th node. If too many trials are used, the capacity needed for decision will increase or the time delay before decision will increase, and less importance will be put to the individual congestion levels. In most cases, the situation of FIG. 1 is to prefer, i.e. where one trial is made, after which a safe choice is made.

Figure 3:
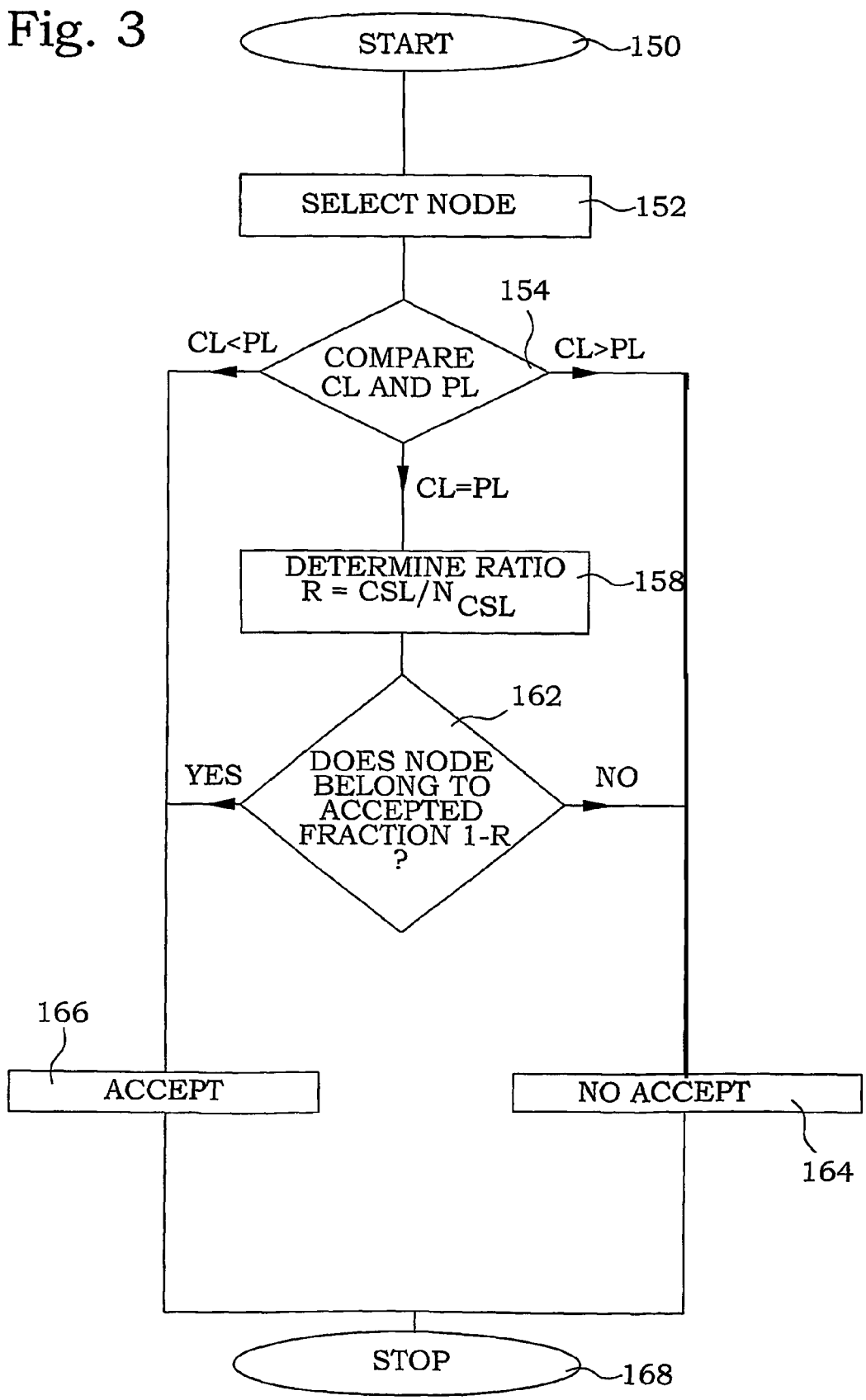
FIG. 3 is a flow diagram illustrating a preferred embodiment of an acceptance criterion usable with the present technology.

A central role in the distribution procedure is the determination of whether or not a certain node can manage the load. This is equivalent with the determination of whether or not it is permitted to send the load to a certain node. FIG. 3 illustrates a part procedure, corresponding to a preferred criterion of the load acceptance or equivalently a preferred criterion of permission to send. This criterion corresponds very closely to the one already used in load distribution based on congestion information in one-to-one node systems. The criterion is based on the congestion level of the intended receiving node, i.e. the node to which the load is intended to be sent, the congestion sublevel of the intended receiving node and on the priority level of the load. The congestion level is related to a coarse rating of the seriousness of any congestion. Within every congestion level, there might be a finer division, so-called congestion sub-level. These sublevels can be used to make the transition between the different main congestion levels smoother.

The number of congestion sublevels may be different for each congestion level, but in a preferred embodiment, all congestion levels have the same number of congestion sublevels.

The part procedure begins in step 150. In step 152, a node to be examined is obtained. In step 154, it is determined whether or not the congestion level of this node is larger than, less thaw, or equal to the priority level of the load. If the congestion level is larger than the priority level, the load is not permitted to be sent, and the procedure continues to step 164. If the congestion level is smaller than the priority level, the load can be managed, i.e. the load is permitted to be sent, and the procedure continues to step 166. If the congestion level and the priority level are equal, the procedure continues to step 158.

In step 158, the congestion sublevel is evaluated. Preferably, a ratio between the congestion sublevel and the number of possible sublevels is determined. This ratio can be used to permit a correct fraction of the loads to be sent, where congestion level and priority level agrees. A high congestion sublevel will decrease the number of loads permitted to be sent, and a low congestion sublevel will increase the number of loads permitted to be sent. Preferably, the fraction of loads, permitted to be sent, is equal to 1 minus the above-mentioned ratio, and subsequently, the fraction of rejected load is equal to the above-mentioned ratio. Assuming such a linear relationship, and for example a total number of 5 congestion sublevels, a congestion sublevel of 2 will imply that 60% of the loads are permitted to be sent to the intended receiving node. If the congestion sublevel instead is equal to 4, only 20% of the loads are permitted. In step 162, it is determined if the present load belongs to the fraction of loads that is to be permitted, and the procedure proceeds to step 164 and 166, respectively. In step 164, the load is rejected and in step 166 the load is accepted. The procedure ends in step 168.

Figure 4:
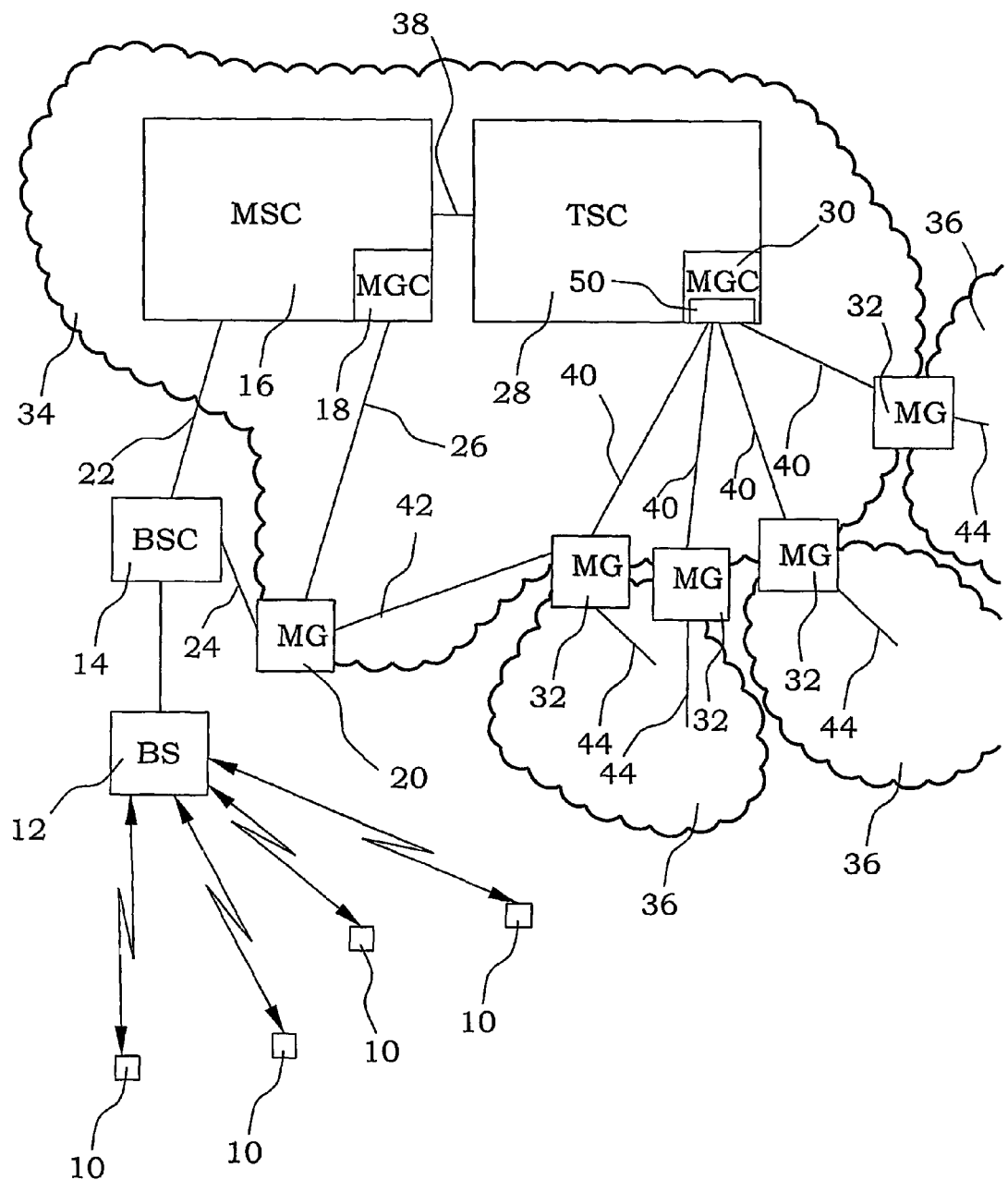
FIG. 4 is a block diagram illustrating an UMTS mobile telephone system according to an example embodiment.

FIG. 4 illustrates a system in which the load distribution method according to the present invention is advantageously applied. This system comprises an UMTS telecommunication system. A number of mobile terminals 10 are communicating with a base station (BS) 12 via radio signals. A base station controller (BSC) 14 controls the base station. The BSC 14 divides the signalling into a connectivity layer and a call control layer. The call control layer takes care of the signalling to control the call, whereas the connectivity layer operates the transmission of the payload traffic between subscribers. The BSC 14 is thus connected to a Mobile Station Controller (MSC) 16 via a control connection 22. The BSC 14 is subsequently also connected to a media gateway (MG) 20 via a connectivity connection 24. The operation of the MG 20 is controlled by the MSC by a Media Gateway Controller (MGC) 18 via a control connection 26.

When bringing the data to and from the mobile terminals 10 out on other networks, a Transit Switching Centre (TSC) 28 is used. The MSC is connected via the call control layer to the TSC 28 by a call control connection 38. A number of MGs 32 act as interfaces between the UMTS network 34 and other networks 36. The MGs 32 receive the payload traffic from the MG 20 via connectivity connections 42, but are controlled from the TSC 28 by an MGC 30 via call control connections 40. The MGC 30 comprises means 50 for performing a selection of suitable nodes. At a call setup procedure, this device 50 thus determine which of the MGs 32 that are to be used for the call. The MGC 30 then performs a distribution of load according to the methods of the present technology, performed by the device 50. The payload traffic associated with the calls are then distributed by connections 44 from the MGs 32 in the different networks 36.

In the above embodiment, a TSC 28 performs a distribution of load. However, in other situations, a similar distribution may be controlled by e.g., a MSC. The MSC may in such a case be equipped with means necessary to perform the distribution of load according to the present technology.

Figure 5:
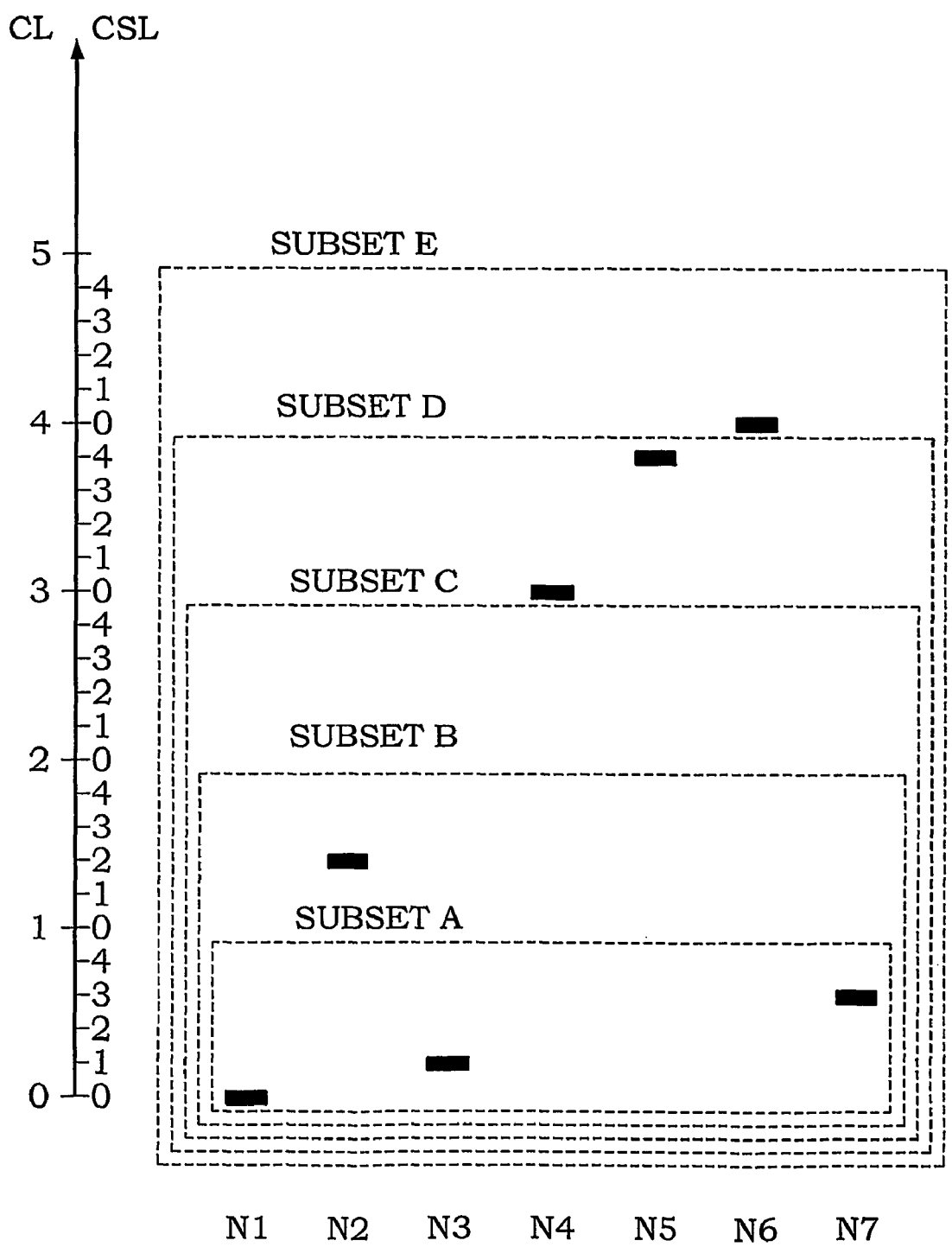
FIG. 5 is a block diagram illustrating the creation of different subsets based on congestion level information.

An important component in the present technology is the creation of the subsets. The subsets may comprise all nodes, and the subsets may comprise no nodes at all, depending on the congestion situation. In FIG. 5, an example of a congestion situation for a 7-node system is illustrated, together with a preferred manner to perform the creation of subsets. The nodes are placed along the horizontal axis, and the congestion level (CL) and congestion sublevels (CSL) connected thereto are positioned along the vertical axis. In this example, node N1 has a CL=0 and CSL=0. Node N2 has a CL=1 and CSL=2, node N3 has a CL=0 and CSL=1, node N4 has a CL=3 and CSL=0, node N5 has a CL=3 and CSL=4, node N6 has a CL=4 and CSL=0 and node N7 has a CL=0 and CSL=3. A number of subsets are created. A subset A comprises N1, N3 and N7, which corresponds to the nodes having a CL equal to zero. A subset B comprises N1, N2, N3 and N7, which corresponds to the nodes having a CL less than or equal to one. Subsets C, D and E are constructed in an analogue manner.

When a load is obtained, which is associated with a priority level of 3, the subset D can for instance be used as the first subset. In this subset, all nodes except N6 are included. If any of the nodes N1, N2, N3 or N7 is selected as first node, the node is assigned to be the destination node. If N4 or N5 is selected, the congestion sublevel CSL will give a probability for the load to be permitted to be sent to the node. It is thus possible in some cases that a node with congestion level 3 can accept a load of priority level 3. If N4 or N5 is selected, but determined not to accept the load, the second step takes over.

As anyone skilled in the art understands, the creation of subsets could be performed in advance, like in FIG. 5, or the creation could take place at the occasion when they are needed. By creating the subsets in advance, a simple selection among pre-created subsets has to be performed every time a subset is to be created. Information, e.g. about last selected node, can also be stored, which can be useful in some cases, see further descriptions below. However, a creation of the subsets at each occasion has the advantage that one insures that only the latest available congestion level information is guaranteed to be used.

In some cases, the subset does not need to be created at all, in a explicit meaning. It is only necessary with means for determining whether or not a node fulfils the criterion of belonging to the subset. The information about which ones of all the nodes that belong to a certain subset may not need to be extracted from the total set of nodes at any time. However, "creating a certain subset" and "determining whether the criterion which belongs to this certain subset is fulfilled or not" are basically equivalent.

In the second step, the subset is a "safe" one, in this example e.g. subset C. All nodes within subset C will accept the load, without need to check the congestion sublevels. Any node selected from this subset will be assigned as destination node for the load.

Note the special case that N1 is a safe choice after every first subset (also to subset A), since N1 is not congested.

It is obvious that other subsets can be created, which will have similar result. In a preferred embodiment, all nodes are used in the first subset. In this case the "creation" of the subset is trivial. In another embodiment, the first created subset could be the difference between subsets C and D, i.e. only nodes having a CL of exactly 3. However, special attention has to be paid when there are no nodes with such congestion levels.

The selection of a node from a subset is also of importance. In most applications, an even selection probability is to prefer. FIG. 6a illustrates one possibility for selection of the subset B of FIG. 5. The subset comprises four nodes. All nodes are given the same probability, i.e. 0.25. Every time a selection from this subset is to be performed, a random selection according to these probabilities can then easily be executed. However, it is obvious that a weighted probability also can be used. The node N2 can for instance be given a higher probability than the rest of the nodes, if N2 has a higher capacity than the rest or N2 is cheaper to use.

An alternative, when using uniform probabilities, is to create an internal order in the subset. FIG. 6b illustrates subset B, and here the nodes are ordered in increasing order. A pointer points at the last selected node, in this example N2. Next time a selection from this subset is to be performed, the pointer will be moved one step, i.e. to node N3. When the pointer reaches the end of the list, it will continue from the top again. With this alternative, the subset B does not need to be explicitly created, as discussed above, but the pointer is updated to the next node that fulfils the criterion of belonging to the subset. However, this assumes that all nodes could be arranged in some fixed order.

There are several methods of measuring congestion levels in prior art. The present technology does not rely on any specific of these methods, and any congestion measuring method giving some type of congestion level and preferably also a congestion sublevel is possible to use. One example would be to regulate the occupation of messages in the transmission buffers in the MGC, so that the transmission buffer towards a MG does not overflow. The regulation is performed by the MGC by changing the value of CL and/or CLS. Another way would be that a MG regulates its own load by sending CL or CSL (or both) to connected MGCs. The regulation is performed by the MG by changing the value of CL and/or CSL. A third manner to perform this, influenced by SCCP, is that a MG regulated its own load by sending CL to connected MGCs. The MGCs use a timer to calculate CSL. The regulation is performed by the MG by changing the value of CL.

It is preferably, if the congestion levels of the different available nodes are updated now and then. The updating could be continuous, in that sense that when a change in congestion level occurs, the change will immediately be reported to the unit controlling the load distribution. Alternatively, the load distribution control unit will intermittently request congestion level information from the different nodes. When new congestion data is achieved, the subsets should be re-evaluated, if pre-created subsets are used. Nodes changing their congestion level may then be deleted or added to different pre-created subsets.

The priority level has a central role in the present technology. In mobile telephony systems, the system may assign a priority to each call request, depending on the type of call. In a typical case, a request for setting up a call from a subscriber within the base stations connected to the UMTS system, i.e. an originating call, will be associated with a priority level of 1. Call setups, which are requested by an external source, for instance another MSC or a node in another network, i.e.

incoming calls, will be associated with a priority level of 2. This higher priority can be motivated in that an incoming call already occupies resources in the connected networks and these already occupied resources should be allowed to be used for a useful information transfer as far as possible. An incoming call has already consumed resources, e.g. processor capacity, and if such a call is rejected, then more resources are wasted in the network than if an originating call, which has until then consumed less capacity, is rejected. Certain call setups can also be assigned a priority level of 3 and higher, depending on the type of call. For instance, a call originating from a subscriber that has dialed an emergency number may automatically be given a high priority. Such priorities are normally set by the system. When a node gets congested, the first action is to reject originating calls. Next step is to reject incoming calls and the further next step is also to reject emergency calls.

The technology takes advantage of the whole congestion situation of the system for distributing calls among the nodes. The oscillations are reduced and the total throughput is increased. When no nodes are congested, the load is equally distributed. If the intensity and mix (with respect to priority level) of new loads is stable, and if the congestion level or a congestion sublevel of one node changes, then the load towards other nodes with higher or equal congestion level is not at all affected. If the intensity and mix of new loads is stable, then the load towards one node is a linear function of the congestion sublevel for that node (with other conditions constant). These latter characteristics are valid for the preferred embodiments, described above.

Although the described examples are directed towards telecommunication systems, the present invention is applicable in other message distribution systems as well, such as general datacommunication systems.

It will be understood by those skilled in the art that various modifications and changes may be made to the present invention without departure from the scope thereof, which is defined by the appended claims.

The invention claimed is:

1. A method for distribution of load between a plurality of nodes, each of said nodes having an associated congestion level, selected from a limited set of consecutive congestion levels, comprising the acts of:
   (a) creating a first subset of said plurality of nodes;
   (b) selecting by a Media Gateway Controller (MGC) a first node from the first subset of nodes, having a mean congestion level;
   (c) if said first node, according to a predetermined criterion, is capable of handling said load, assigning by the Media Gateway Controller (MGC) said first node as a destination node, said predetermined criterion being based on said congestion levels and a priority level associated to said load, said priority level being selected from a limited set of consecutive priority levels;
   (d) if said first node, according to said predetermined criterion, is not capable of handling said load, repeating acts (a) to (d) using another node of the first subset as the first node until a destination node is assigned, but at most a predetermined number of times;
   (e) if the acts (a) to (d) have been repeated the predetermined number of times, performing the following part acts:
      (e1) creating a second subset of said plurality of nodes having a mean congestion level that is lower than for said first subset, said second subset comprising nodes capable of handling said load according to said predetermined criterion;
      (e2) if said second subset is empty, rejecting said load; and
      (e3) if said second subset comprises at least one node, selecting by the Media Gateway Controller (MGC) a second node from said second subset and assigning said second node as destination node;
   (f) if a destination node is assigned, distributing by the Media Gateway Controller (MGC) said load to said assigned destination node.

2. A method according to claim 1, wherein said first subset comprises all nodes.

3. A method according to claim 1, wherein said first subset comprises all nodes having a congestion level lower than or equal to a first number, being larger than or equal to said priority level.

4. A method according to claim 3, wherein said first number is equal to said priority level.

5. A method according to claim 1, wherein said second subset comprises all non-congested nodes.

6. A method according to claim 1, wherein said second subset comprises all nodes having a congestion level lower than or equal to a second number, being less than said priority level.

7. A method according to claim 6, wherein said second number is one unit less than said priority level.

8. A method according to claim 1, wherein said predetermined criterion states that:
   a node is capable of handling a load if the congestion level of said node is less than said priority level; and
   a node is not capable of handling a load if the congestion level of said node is larger than said priority level.

9. A method according to claim 8, wherein said predetermined criterion further states that a node having a congestion level equal to said priority level is capable of handling a load according to a sub-criterion.

10. A method according to claim 9, wherein each node further has an associated congestion sublevel, said congestion sublevel being selected from a limited set of consecutive congestion sublevels for each congestion level, whereby said sub-criterion states that a node having a congestion level equal to said priority level is capable of handling a load in a fraction of cases, said fraction is based on said congestion sublevel in that a larger congestion sublevel gives a smaller fraction.

11. A method according to claim 10, wherein said fraction is determined by 1 minus the ratio between the difference of said congestion sublevel of said node and the lowest congestion sublevel in said set of congestion sublevels and the number of congestion sublevels in said set of congestion sublevels.

12. A method according to claim 1, wherein the number of priority levels in said set of priority level is equal to or less than the number of congestion levels in said set of congestion levels.

13. A method according to claim 1, wherein at least one of said selecting acts in turn comprises the acts of:
   selecting a node from the subset in a random manner, each node having the same probability.

14. A method according to claim 1, wherein at least one of said selecting acts in turn comprises the acts of:
   selecting a node from the subset in a random manner, each node having a weighted probability.

15. A method according to claim 1, wherein at least one of said selecting acts in turn comprises the acts of:
   arranging nodes in the subset in a certain order; and
   selecting a node from the subset in said certain order.

16. A method according to claim 1, comprising the further act of:
updating said congestion levels and congestion sublevels, if any, continuously or intermittently.

17. A method for distribution of load between a plurality of nodes, each of said nodes having an associated congestion level, selected from a limited set of consecutive congestion levels, the method comprising the acts of:
creating a first subset of said plurality of nodes;
selecting by a Media Gateway Controller (MGC) a first node from said first subset, having a mean congestion level;
if said first node, according to a predetermined criterion, is capable of handling said load, assigning said first node as a destination node, said predetermined criterion being based on said congestion levels and a priority level associated to said load, said priority level being selected from a limited set of consecutive priority levels;
if said first node, according to said predetermined criterion, is not capable of handling said load, performing the following part acts:
creating a second subset of said plurality of nodes having a mean congestion level that is lower than for said first subset, said second subset comprising nodes capable of handling said load, according to said predetermined criterion;
if said second subset is empty, rejecting said load; and
if said second subset comprises at least one node, selecting by the Media Gateway Controller (MGC) a second node from said second subset and assigning said second node as the destination node;
if a destination node is assigned, distributing by the Media Gateway Controller (MGC) said load to said assigned destination node.

18. Method according to claim 17, wherein said first subset comprises all nodes.

19. Method according to claim 17, wherein said first subset comprises all nodes having a congestion level lower than or equal to a first number, being larger than or equal to said priority level.

20. Method according to claim 17, wherein said second subset comprises all non-congested nodes.

21. Method according to claim 17, wherein said second subset comprises all nodes having a congestion level lower than or equal to a second number, being less than said priority level.

22. A device for node selection for load distribution between a plurality of nodes, each of said nodes having an associated congestion level, selected from a limited set of consecutive congestion levels, said device comprising:
(a) means for creating a at least a first subset of said plurality of nodes;
(b) means for selecting at least a first a node from said first subset of nodes, having a mean congestion level;
(c) means for assigning said first node as a destination node, a predetermined criterion being based on said congestion levels and a priority level associated to said load, said priority level being selected from a limited set of consecutive priority levels, said means for assigning being operable if said first node, according to said predetermined criterion, is capable of handling said load;
whereby, if said first node, according to said predetermined criterion, is not capable of handling said load, means (a) to (c) are repeatedly operated to select another node from the first set to be the first node until the destination node is assigned, but at most a predetermined number of times;
(d1) means for creating a second subset of said plurality of nodes, having a mean congestion level that is lower than for said first subset, said second subset comprising nodes capable of handling said load, according to said predetermined criterion;
(d2) means for rejecting said load, operable if said second subset is empty; and
(d3) means for selecting a second node from said second subset and assigning said second node as the destination node, operable if said second subset comprises at least one node;
whereby the means (d1) to (d3) are operable if the means (a) to (c) have been operated the predetermined number of times;
(e) means for controlling the distribution of said load to said assigned destination node, operable if the destination node is assigned.

23. A device for node selection for load distribution between a plurality of nodes, each of said nodes having an associated congestion level, selected from a limited set of consecutive congestion levels, said device comprising:
means for creating a first subset of said plurality of nodes;
means for selecting at least a first node from said first subset of nodes, having a mean congestion level;
means for assigning said first node as a destination node, operable if said first node, according to a predetermined criterion, is capable of handling said load, said predetermined criterion being based on said congestion levels and a priority level associated to said load, said priority level being selected from a limited set of consecutive priority levels;
means for creating a second subset of said plurality of nodes, having a mean congestion level that is lower than for said first subset, said second subset comprising nodes capable of handling said load, according to said predetermined criterion;
means for rejecting said load, operable if said second subset is empty;
means for selecting a second node from said second subset and assigning said second node as the destination node; operable if said second subset comprises at least one node;
whereby said means for creating a second subset, said means for rejecting and said means for selecting a second node are operable if said first node, according to said predetermined criterion, is not capable of handling said load; and
means for controlling the distribution of said load to said assigned destination node, operable if the destination node is assigned.

24. A communication system comprising:
a plurality of nodes, each of said nodes having an associated congestion level, selected from a limited set of consecutive congestion levels;
means for providing a load to be distributed to any of said plurality of nodes:
distribution means for distributing said load to a destination node; and
a device for controlling said distribution means comprising:
means for selecting at least a first node from a first subset of nodes, having a mean congestion level; and
means for selecting a second node from a second subset of nodes, having a mean congestion level that is lower than for said first subset, said second selecting means being operable if said first node is not capable of handling said load;

wherein said device for controlling said distribution means further comprises:
(a) means for creating a subset of said plurality of nodes;
(b) means for selecting a node from said subset;
(c) means for assigning said node selected by (b) as a destination node for said load, a predetermined criterion being based on said congestion levels and a priority level associated to said load, said priority level being selected from a limited set of consecutive priority levels, said means for assigning being operable if said node selected by (b), according to said predetermined criterion, is capable of handling said load;
whereby if said node selected by (b), according to said predetermined criterion, is not capable of handling said load, means (a) to (c) are repeatedly operated, until another selected node is assigned as the destination, but at most a predetermined number of times;
(d1) means for creating the second subset of said plurality of nodes, said second subset comprising nodes capable of handling said load, according to said predetermined criterion;
(d2) means for rejecting said load, operable if said second subset is empty; and
(d3) means for selecting the second node from said second subset and assigning said second node as the destination node, operable if said second subset comprises at least one node;
whereby the means (d1) to (d3) are operable if the means (a) to (c) have been operated the predetermined number of times;
whereby said distribution means is arranged for distribution of said load to said assigned destination node, if a destination node is assigned.

25. A communication system according to claim 24, wherein said system is a telecommunication system or a data communication system.

26. A communication system according to claim 25, herein said system comprises a UMTS network.

27. A communication system comprising:
a plurality of nodes, each of said nodes having an associated congestion level, selected from a limited set of consecutive congestion levels;
means for providing a load to be distributed to any of said plurality of nodes;
distribution means for distributing said load to a destination node; and
a device for controlling said distribution means comprising:
means for creating a first subset of said plurality of nodes;
means for selecting a first node from said first subset;
means for selecting at least a first node from a first subset of nodes, having a mean congestion level;
means for assigning said first node as a destination node, operable if said first node, according to a predetermined criterion, is capable of handling said load, said predetermined criterion being based on said congestion levels and a priority level, said priority level being selected from a limited set of consecutive priority levels;
means for creating a second subset of said plurality of nodes, having a mean congestion level that is lower than for said first subset, said second subset comprising nodes capable of handling said load, according to said predetermined criterion;
means for rejecting said load, operable if said second subset is empty;
means for selecting a second node from said second subset of nodes and for assigning said second node as the destination node, said second node selecting means being operable if said first node is not capable of handling said load and if said second subset comprises at least one node;
whereby said means for creating the second subset, said means for rejecting and said means for selecting the second node are operable if said first node, according to said predetermined criterion, is not capable of handling said load; and
whereby said distribution means is arranged for distribution of said load to said assigned destination node if the destination node is assigned.

* * * * *

UNITED STATES PATENT AND TRADEMARK OFFICE
CERTIFICATE OF CORRECTION

| | |
|---|---|
| PATENT NO. | : 7,751,314 B2 |
| APPLICATION NO. | : 10/473121 |
| DATED | : July 6, 2010 |
| INVENTOR(S) | : Haglund |

It is certified that error appears in the above-identified patent and that said Letters Patent is hereby corrected as shown below:

On the Title Page, in item (58), under "Field of Classification Search", in Column 1, Line 3, delete "395/675, 395," and insert -- 395/675 --, therefor.

On the Title Page, in item (56), under "OTHER PUBLICATIONS", in Column 2, Line 1, delete "Load" and insert -- "Load --, therefor.

On the Title Page, in item (56), under "OTHER PUBLICATIONS", in Column 2, Line 1, delete "systems)" and insert -- systems", --, therefor.

In Fig. 5, Sheet 5 of 6, delete "Fig 5" and insert -- Fig. 5 --, therefor.

In Column 1, Line 5, delete "SEO1" and insert -- SE01 --, therefor.

In Column 4, Line 50, delete "loads" and insert -- load, --, therefor.

In Column 6, Line 14, delete "thaw," and insert -- than, --, therefor.

In Column 9, Line 34, delete "datacommunication" and insert -- data communication --, therefor.

In Column 10, Line 10, in Claim 2, delete "A" and insert -- The --, therefor.

In Column 10, Line 12, in Claim 3, delete "A" and insert -- The --, therefor.

In Column 10, Line 16, in Claim 4, delete "A" and insert -- The --, therefor.

In Column 10, Line 18, in Claim 5, delete "A" and insert -- The --, therefor.

In Column 10, Line 20, in Claim 6, delete "A" and insert -- The --, therefor.

Signed and Sealed this
First Day of March, 2011

David J. Kappos
*Director of the United States Patent and Trademark Office*

CERTIFICATE OF CORRECTION (continued)

U.S. Pat. No. 7,751,314 B2

In Column 10, Line 24, in Claim 7, delete "A" and insert -- The --, therefor.

In Column 10, Line 26, in Claim 8, delete "A" and insert -- The --, therefor.

In Column 10, Line 32, in Claim 9, delete "A" and insert -- The --, therefor.

In Column 10, Line 36, in Claim 10, delete "A" and insert -- The --, therefor.

In Column 10, Line 45, in Claim 11, delete "A" and insert -- The --, therefor.

In Column 10, Line 52, in Claim 12, delete "A" and insert -- The --, therefor.

In Column 10, Line 56, in Claim 13, delete "A" and insert -- The --, therefor.

In Column 10, Line 60, in Claim 14, delete "A" and insert -- The --, therefor.

In Column 10, Line 64, in Claim 15, delete "A" and insert -- The --, therefor.

In Column 11, Line 1, in Claim 16, delete "A" and insert -- The --, therefor.

In Column 11, Line 35, in Claim 18, delete "A" and insert -- The --, therefor.

In Column 11, Line 37, in Claim 19, delete "A" and insert -- The --, therefor.

In Column 11, Line 41, in Claim 20, delete "A" and insert -- The --, therefor.

In Column 11, Line 43, in Claim 21, delete "A" and insert -- The --, therefor.

In Column 11, Line 51, in Claim 22, after "creating" delete "a".

In Column 11, Line 53, in Claim 22, after "first" delete "a".

In Column 12, Line 56, in Claim 24, delete "nodes:" and insert -- nodes; --, therefor.

In Column 13, Line 15, in Claim 24, delete "operated," and insert -- operated --, therefor.

In Column 13, Line 34, in Claim 25, delete "A" and insert -- The --, therefor.

In Column 13, Line 37, in Claim 26, delete "A" and insert -- The --, therefor.

In Column 13, Line 37, in Claim 26, delete "herein" and insert -- wherein --, therefor.